United States Patent [19]

Masui et al.

[11] Patent Number: 4,860,416
[45] Date of Patent: Aug. 29, 1989

[54] VARIABLE-CROWN ROLL

[75] Inventors: Takeshi Masui; Yoshiro Matsumoto, both of Nishinomiya; Atsushi Tomizawa, Kobe; Eiji Hirooka, Yamato-Koriyama, all of Japan

[73] Assignee: Sumitomo Metal Industries, Osaka, Japan

[21] Appl. No.: 264,348

[22] Filed: Oct. 31, 1988

[30] Foreign Application Priority Data

Mar. 30, 1988 [JP] Japan ................... 63-78445

[51] Int. Cl.⁴ ............................................. B21B 13/02
[52] U.S. Cl. ................... 29/116.2; 29/116.1; 29/129.5; 29/130
[58] Field of Search ............... 29/116.1, 116.2, 129.5, 29/130; 162/358; 72/199, 238, 239, 241, 245, 247

[56] References Cited

U.S. PATENT DOCUMENTS

| | | | |
|---|---|---|---|
| 851,419 | 4/1907 | Hess | 29/116.1 |
| 1,834,501 | 12/1931 | Smelik et al. | 29/116.1 |
| 2,635,300 | 4/1953 | Butler | 29/116.1 |
| 2,771,658 | 11/1956 | Morrill | 29/116.1 |
| 3,406,438 | 10/1968 | Reilly | 29/116.1 |
| 3,419,890 | 12/1968 | Justus | 29/116.1 |
| 3,505,716 | 4/1970 | Moser | 29/116.1 |

Primary Examiner—Howard N. Goldberg
Assistant Examiner—Irene Cuda
Attorney, Agent, or Firm—Burns, Doane, Swecker & Mathis

[57] ABSTRACT

A variable-crown roll comprises a straight arbor, an a plurality of antifriction bearings which are mounted on the arbor, each of the bearings having a cylindrical outer surface which is sloped with respect to the outer surface of the arbor, the bearings being symmetrically disposed with respect to the lengthwise center of the arbor, the slopes of the outer surfaces of the bearings on one side of the lengthwise center of the arbor being symmetric with respect to the slopes of the outer surfaces of the bearings on the other side of the lengthwise center.

42 Claims, 8 Drawing Sheets

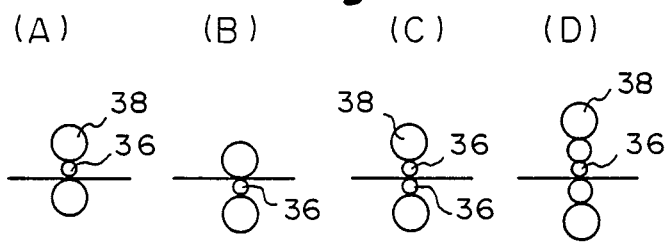
Fig. 10
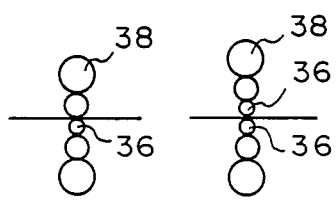
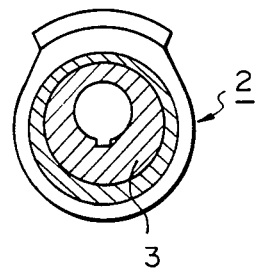
Fig. 11
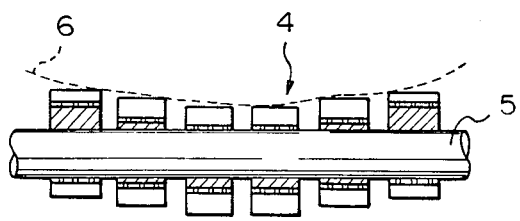
Fig. 12

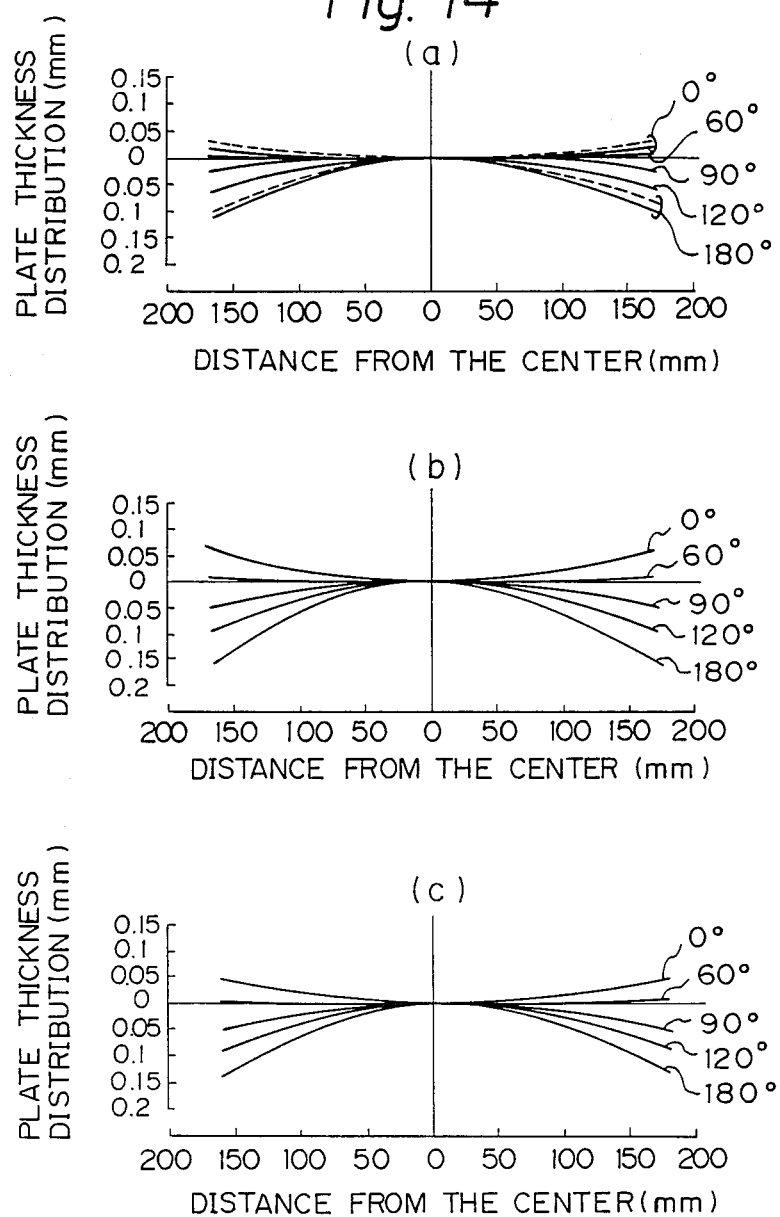

VARIABLE-CROWN ROLL

BACKGROUND OF THE INVENTION

This invention relates to a variable-crown roll for use in multi-roll rolling mill.

In the rolling of plates, it is important that the plate profile (the thickness distribution in the widthwise direction) be rectangular, that the plate thickness be always constant, and it is particularly important that good shape control be carried out, i.e., that the flatness of the rolled plate be constant. Various new types of rolling mills have been developed in order to meet these requirements. In order to improve the flatness and profile of a plate, it is necessary to compensate the deflection of the work roll, and for this purpose, the work roll bending method, the back-up roll bending method, the double chock bending method, the roll skew method, the roll shift method, the variable-crown roll method (sometimes referred to as the VC roll method), and the like have been developed.

Of these methods, the variable-crown roll method is particularly economical because a conventional rolling mill can be adapted so as to perform variable-crown rolling merely by replacing a conventional roll of the rolling mill with a variable-crown roll. Variable-crown rolls have been effectively employed in combination with existing roll benders for improving the flatness and profile of rolled plates.

In a conventional variable-crown roll, a sleeve is mounted on an arbor by shrink fitting. High-pressure oil is introduced into a pressure chamber at the center of the roll, and the sleeve is made to expand. The limit to the stress which can be applied to the sleeve restricts the amount of roll crown which can be produced to a relatively small value. For example, with a large-sized variable-crown with a diameter on the order of 1500 mm, the maximum amount of expansion which can be achieved is roughly 0.2–0.4 mm/radius. This amount of roll crown is adequate for normal rolling of soft thin sheets. However, when rolling thick plates, even if a conventional variable-crown roll is combined with a bender, the amount of crown which is obtainable is inadequate. In particular, in a roughing mill for hot rolling of aluminum or steel or a rolling mill for thick steel plates, roll crown on the order of 2–3 times the above-described amount is required. Furthermore, even when rolling sheets, if the material being rolled is a hard material or an alloy steel which has a high resistance to deformation, the amount of roll crown obtained with a conventional variable-crown roll can be inadequate.

Some of the above-described rolling methods allow a large amount of control, but they have problems such as that equipment costs are high and that modification of conventional equipment so as to perform these methods takes much time. Accordingly, there has been a desire for the development of a new kind of roll which, like a variable-crown roll, can merely replace a conventional roll, and which provides high performance, is simple, and is also economical.

Multi-roll mills including Sendzimir rolling mills employ eccentric rolls to obtain roll crown. These rolls, however, have not been utilized as a back-up roll or work roll for rolling mills such as 4-high rolling mills, 6-high rolling mills, and 2-high rolling mills.

In addition, the above-described multi-roll mills are for the purpose of shape control during cold rolling, and they have not been utilized for performing profile control during hot rolling.

For example, in a Sendzimir rolling machine, an outermost back-up roll of which is shown in cross section in FIG. 11, a plurality of eccentric rings 3 arranged in the longitudinal direction are mounted on an outermost back-up roll 2 (As-U-Roll) which supports an unillustrated, small-diameter work roll. The roll crown in the longitudinal direction of the roll is adjusted by adjusting the rotational angle of each eccentric ring.

In a differential roll speed rolling mill, a bridle roll of which is shown in cross section in FIG. 12, as indicated by reference FIG. 4, is used as eccentric rolls for performing tension control. The envelope of crown 6 is changed from concave to convex by changing the rotational angle of a shaft 5, whereby the distribution of tensile force applied to a strip is varied (Japanese Laid-Open Specification No. 61-276704(1986)).

Japanese Laid-Open Patent Application Specification No. 61-7003 (1986) discloses a mechanism in which a thin sleeve covers a roll which is divided into a plurality of ring-like sections, each of which is mounted on an arbor and is eccentric with respect to the axis of the arbor. The degree of eccentricity of the sections gradually increases towards the lengthwise center of the arbor. Roll crown can be varied by adjusting the position of each of the divided sections of the roll.

However, with that mechanism, stepped portions are inevitably formed each in the divided roll sections, so when the roll is used as a back-up roll for a work roll, some portions of the back-up roll always remain not in contact with the work roll. As a result, stress concentrates in the corners of the outer periphery of the sleeve of the back-up roll, and the corners of the sleeve can easily form scratches in the sleeve and the work roll. Even if the corner of each of the divided roll sections is made round, this problem is only slightly mitigated and can not be completely solved. It is possible to reduce the size of the stepped portions in the divided roll sections by dividing the roll into a larger number of sections, resulting in a smaller step between each section of the roll. However, doing so increases the complexity of the structure of the roll and makes maintenance more difficult.

SUMMARY OF THE INVENTION

Accordingly, it is an object of the present invention to provide a variable-crown roll which can be used in a rolling mill.

It is another object of the present invention to provide a variable-crown roll which requires little maintenance.

It is still another object of the present invention to provide a variable-crown roll which has a relatively large roll crown and which has a smooth outer surface with no stepped portions therein.

It is a further object of the present invention to provide a variable-crown roll which can be installed in a conventional rolling mill in place of a regular back-up roll.

The present invention is a variable-crown roll comprising a straight arbor, a plurality of antifriction bearings which are mounted on said arbor, each of said bearings having a cylindrical outer surface which is sloped with respect to the outer surface of said arbor, i.e., the central axis of the cylindrical outer surface being made inclined with respect to the axis of the arbor, said bearings being symmetrically disposed with respect to the lengthwise center of said arbor, the slopes of the outer surfaces of said bearings on one side of the lengthwise center of said arbor being symmetric with respect to the slopes of the outer surfaces of said bearings on the other side of the lengthwise center, and if necessary further a cylindrical sleeve which loosely fits over said bearings and means for transmitting thrusts from said cylindrical sleeve to said arbor.

In still another aspect, the present invention is a variable-crown roll comprising a straight arbor, a plurality of first antifriction bearings which are mounted on said arbor, each of said first bearings having a cylindrical outer surface which is sloped with respect to the outer surface of said arbor, said first bearings being symmetrically disposed with respect to the lengthwise center of said arbor, the slopes of the outer surfaces of said first bearings on one side of the lengthwise center of said arbor being symmetric with respect to the slopes of the outer surfaces of said first bearings on the other side of the lengthwise center, a second antifriction bearing which is mounted on the center of said arbor between said first bearings, said second bearing having a cylindrical outer surface which is parallel to but eccentric with respect to the outer surface of said arbor, and if necessary further a cylindrical sleeve which loosely fits over said first and second bearings and means for transmitting thrusts from said cylindrical sleeve to said arbor.

Namely, as opposed to the conventional method of producing roll crown in which bearings are eccentric with respect to an arbor, in accordance with the present invention, the bearings are sloped with respect to the arbor. Therefore, the outer surface of the roll is smooth and has no stepped portions, and a relatively large roll crown can be obtained.

According to one embodiment of the present invention, the bearing may be mounted on a bushing which is secured to the arbor. The outer peripheral surface of the bushing is sloped with respect to the outer peripheral surface of the arbor, and at least one spacer having parallel or sloping sides may be disposed between adjacent bearings or bushings.

The antifriction bearing used in the present invention is not restricted to a specific one, but it is preferable, especially when spacers having sloping sides are inserted between adjacent bearings, to use at least one bearing which has an outer race which is wider than an inner race so as to decrease the gap between the outer races of the adjacent bearings.

Furthermore, sealed bearings are employed, so the maintenance of the bearings can be greatly simplified.

An oil supply passageway may be formed within the arbor, and lubricating oil is supplied to the bearings through the oil supply passageway. Alternatively, an oil supply hole for supplying an oil mist to the space between the inner race and the outer race of the antifriction bearings and an oil supply hole for recovering the oil mist can be formed in the arbor.

In addition, an oil supply hole for supplying oil to the space between the cylindrical sleeve and the outer race of the antifriction bearings can also be formed in the arbor. Seals are provided on the ends of the arbor so as to seal the lubricating oil inside the arbor. As a result, the wear and seizure of the bearings for the sleeve can be prevented, even under severe rolling conditions when the rotational speed or the rolling load is high.

If at least one variable-crown roll in accordance with the present invention is employed as a back-up roll for a rolling machine like a 4-high mill, 6-high mill and so on in combination with an already-installed roll bender, the shape and profile of an item being rolled can be effectively controlled. In the case of 2Hi mills the variable-crown roll in accordance with the present invention may be used as a work roll. (In the present explanation, rolls which directly contact the material being rolled are referred to as work rolls, while all other rolls are referred to as back-up rolls.)

In a preferred embodiment of the present invention, at least one variable-crown roll in accordance with the present invention is employed as a work roll or a back-up roll for a rolling mill. By adjusting the rotational angle of the roll in the circumferential direction of the arbor, the crown which is defined by the envelope of the outer diameter of the sleeve can be freely adjustable from a convex crown to a concave crown. The variable-crown roll is combined with a roll bender, and shape control and/or profile control of the material being rolled is performed in accordance with a signal from a detector which detects the crown of the material being rolled.

Thus, in a variable-crown roll in accordance with the present invention, roll crown is achieved by sloping the bearings with respect to the roll arbor, so a large amount of crown can be obtained. For example, with a roll having a diameter of 1500 mm, a roll crown of 1.0 mm per radius can be easily obtained. This is 3–5 times the magnitude of the roll crown of 0.2–0.4 mm/radius which is obtainable using a conventional variable-crown roll. It is thus clear that the benefits of the present invention are extremely valuable.

BRIEF DESCRIPTION OF THE DRAWINGS

FIGS. 10(A)-(F) are schematic views illustrating various types of mills in which a variable-crown roll of the present invention can be utilized;

FIG. 11 is a transverse cross-sectional view of a back-up roll (As-U-Roll) of a conventional Sendzimir rolling mill;

FIG. 12 is a longitudinal cross-sectional view of bridle rolls of a different roll speed rolling mill;

FIGS. 14a-14c are also graphs showing the results of rolling using the variable-crown roll of the present invention;

In the drawings, the same reference numerals indicate the same or corresponding parts.

DESCRIPTION OF THE PREFERRED EMBODIMENTS

Next, the present invention will be described in greater detail while referring to the accompanying drawings.

Figure 1:
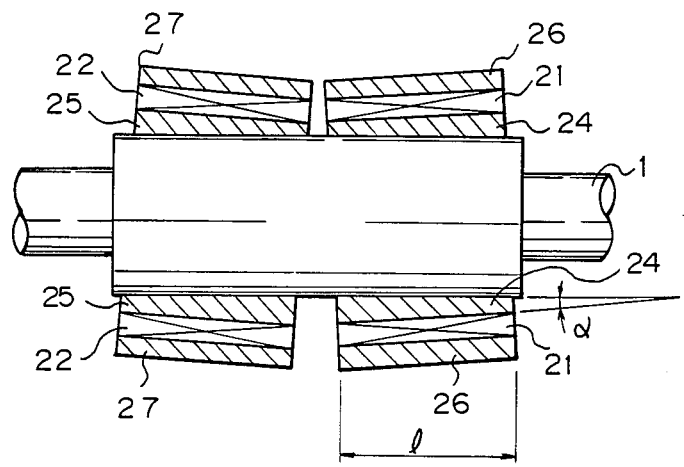
FIGS. 1 through 5 are longitudinal cross-sectional views of various embodiments of variable-crown rolls in accordance with the present invention.

The basic structure of a variable-crown roll in accordance with the present invention is illustrated in FIG. 1. As shown in this figure, two thin, large-diameter bearings 21 and 22 are mounted on a straight arbor 1. The bearings 21 and 22 have inner races 24 and 25 and outer races 26 and 27, respectively. The inner and outer surfaces of the inner races 24 and 25 are sloped with respect to one another by angle $\alpha$. The inner races 24 and 25 are secured to the outer surface of the arbor 1 by shrink fitting, expansion fitting, interference fitting, keys, or other suitable means. The radial center of the inner peripheral surface of the inner race of each bearing is eccentric with respect to the radial center of the outer peripheral surface of the inner race of the same bearing at the ends of the inner races. Furthermore, a thin wall portion at one end of each of the bearings lies on a longitudinal extension of a thick wall portion of the other end. More precisely, the maximum thickness at one end lies on a longitudinal extension of a portion of the other end which is thinner than the maximum thickness at the first end. The outer races 26 and 27 of the bearings 21 and 22 are able to freely rotate with respect to the arbor 1. When rolling is being carried out, only the outer races of the bearings rotate. The slopes of the outer surfaces of the outer races are symmetric with respect to the lengthwide center of the arbor 1.

If the angle of slope of the inner races 24 and 25 is $\alpha$ and the length of each bearing is l, then the crown $\delta = \alpha \times l$. If a work roll is disposed beneath the roll of FIG. 1, then a convex crown of magnitude $\delta$ is obtained, and if the arbor 1 is rotated 180° from this position, a crown of magnitude $-\delta$ is obtained. Accordingly, by adjusting the angle of rotation of the arbor 1, it is possible to adjust the magnitude of the crown by an amount 2 between $+\delta$ and $-\delta$.

In FIG. 1, the arbor 1 is equipped with two bearings 21 and 22 which contact a work roll, for example. At the center of the roll between the two outer races 24 and 25 of the two bearings, there are portions which contact the work roll and portions which do not. As a result, the luster and amount of wear of the work roll will differ between these two portions, and therefore it is impossible to use the variable-crown roll of FIG. 1 for rolling of products which have strict requirements as to luster and other surface conditions.

Figure 2:
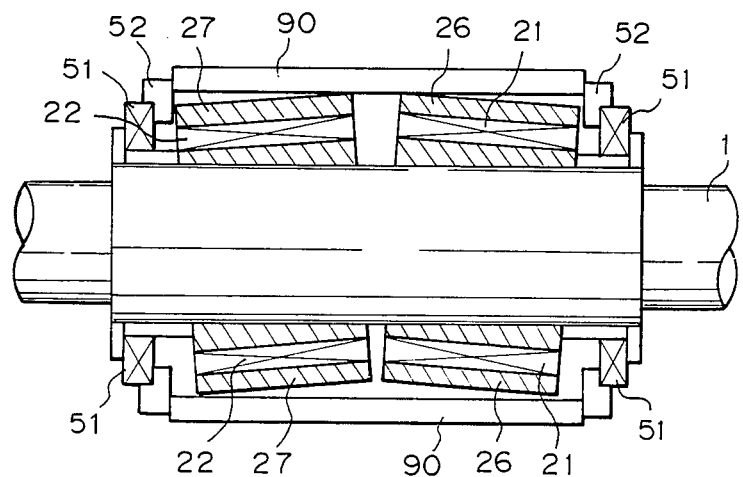

FIG. 2 is a cross-sectional view of a variable-crown roll of the present invention which can be used for manufacturing products having such strict requirements. This roll has a cylindrical sleeve 90 which is loosely fit over the outer races of bearings 21 and 22 like those illustrated in FIG. 1. Both ends of the cylindrical sleeve 90 are supported by thrust bearings 51 which are mounted on flanges 52. In a variable-crown roll having the structure shown in FIG. 2, when a rolling load is transmitted from a work roll, the portion of the cylindrical sleeve 90 which contacts the work roll undergoes elastic bending and contacts the outer races 26 and 27 of the bearings, and the cylindrical sleeve 90 rotates together with the outer races. At this time, the cylindrical sleeve 90 contacts the work roll around its entire periphery, so there is no irregularity in the luster or amount of wear of the work roll. As a result, it is possible to perform rolling of soft materials or products requiring a high-quality finish.

Of course, if an intermediate roll is placed between the work roll and the back-up roll, there is no problem at all in using the variable-crown roll of FIG. 1 as a back-up roll. In addition, even in a rolling mill such as a four-high rolling mill in which a back-up roll directly contacts the work roll, if a rolling method is employed in which either the back-up roll or the work roll is moved in its axial direction, wear and nonuniformities in the luster of the work roll are dispersed over the length of the work roll, and in this case there is no particular problem with using the roll of FIG. 1 as a back-up roll.

In the embodiment of FIGS. 1 and 2, two bearings 21 and 22 are mounted on the arbor 1, but it is also possible to employ three, four, or a larger number of bearings.

Figure 3:
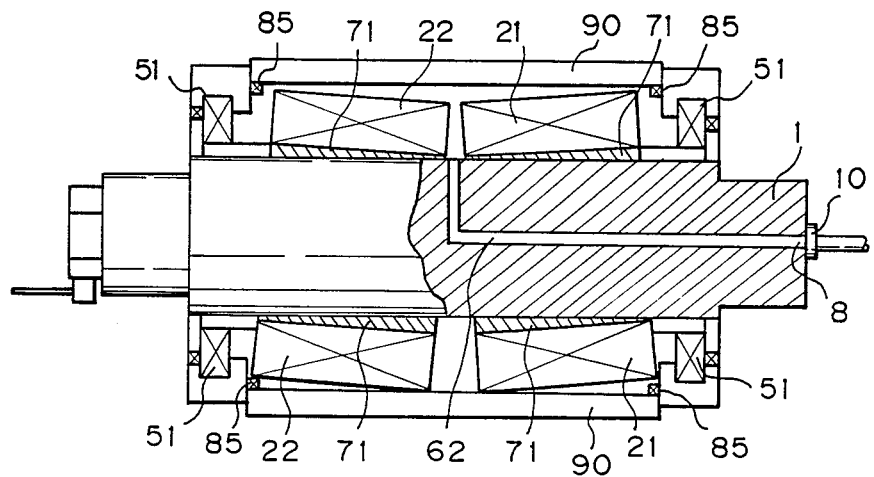
Figure 16:
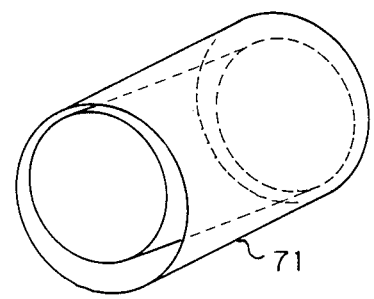
FIG. 16 is an enlarged schematic perspective view of a bushing having sloping inner walls.

FIG. 3 is a cross-sectional view of another embodiment of a variable-crown roll of the present invention in which sloped bushings 71 whose outer surfaces slope upwards to the right and left from the lengthwise center of the arbor 1 are mounted on the outer surface of the arbor 1. Bearings 21 and 22 are fit over the outer surfaces of the bushings 71. The radial center of the inner periphery of each bushing 71 is eccentric with respect to the radial center of the outer periphery of the same bushing 71 at the ends of the bushing 71. It is not essential that the portion of minimum thickness at one end of the bushing 71 lie on a longitudinal extension of the portion of maximum thickness at the other end of the bushing 71. It is sufficient that the maximum thickness at one end lies on a longitudinal extension of a portion of the other end which is thinner than the portion of maximum thickness at the first end. FIG. 16 is a schematic perspective view of a sloped bushing 71. The bushing 71 has a cylindrical outer surface and a cylindrical bore at its center. The axis of the cylindrical bore is not parallel to the axis of the outer surface. The bushings 71 can be secured to the arbor 1 by means of a shrink fit, an expansion fit, an interference fit, keys, or the like.

A cylindrical sleeve 90 is loosely fit on the outside of the bearings 21 and 22. In the embodiment of FIG. 3, the space between the arbor 1 and the cylindrical sleeve 90 is airtight, and an oil supply passageway 62 is formed in the center of the arbor 1, one end thereof opening onto the outer peripheral surface of the center of the arbor 1. Lubricating oil can be supplied to the airtight space through the oil supply passageway 62. Seals 85 are provided between the cylindrical sleeve 90 and thrust bearings 51 which bear the thrust from the cylindrical sleeve 90. One end of the oil supply passageway 62 opens onto an oil supply port 8 formed on one end surface of the arbor 1 and is connected to an unillustrated oil supply by a rotating joint 10.

In this manner, lubricating oil can be supplied to the bearings 21 and 22 through the oil supply passageway 62, whereby the life span of the bearings can be lengthened and the load which can be applied to the roll can be increased.

Figure 4:
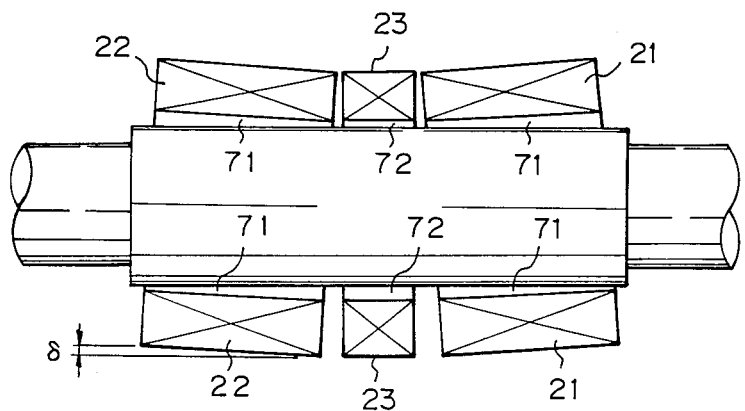

FIG. 4 is a partially cross-sectional front view of another embodiment of the present invention. In this embodiment, two sloped bushings 71 are secured to the outside of an arbor 1, and a cylindrical bushing 72 with parallel walls is secured to the outside of the arbor 1 between the two sloped bushings 71. Three separate bearings 21, 22 and 23 are mounted on the bushings 71 and 72. The left and right bushings 71 are identical to the bushings 71 of FIG. 3 and are symmetrically disposed with respect to the lengthwise center of the roll. Similarly, the right and left bearings 21 and 22 which are mounted on bushings 71 are identical to the corresponding bearings 21 and 22 of the previous embodiment. The radial centers of the inner and outer peripheral surfaces of the cylindrical bushing 72 disposed at the center of the arbor 1 are eccentric with respect to one another, but both surfaces are each parallel to the outer surface of the arbor 1. The radial center of the outer periphery of the outer race of the central bearing is eccentric with respect to the axis of the arbor 1, but the outer peripheral surface thereof is parallel to the outer peripheral surface of the arbor 1.

Figure 5:
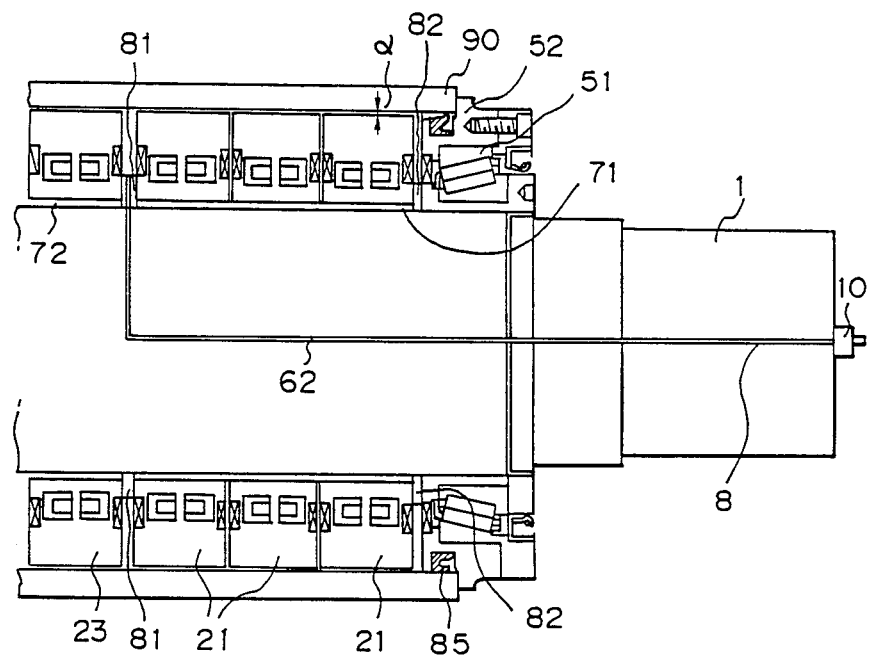

FIG. 5 is a partially cross-sectional front view of the right lengthwise half of another embodiment of a roll in accordance with the present invention. In this embodiment, three sloped bearings 21 are mounted on a sloped bushing 71 on the right side of an arbor 1, three unillustrated sloped bearings 22 are mounted on an unillustrated bushing 71 on the left side of the arbor 1, and an eccentric bearing 23 is mounted on a parallel-walled bushing 72 at the center of the arbor 1 for a total of 7 bearings. All of the bearings are sealed bearings. The roll is symmetric about its lengthwise center. The bushings 71 and 72 and the bearings 21, 22 and 23 are positioned on the arbor 1 by means of spacers 81 and 82 having sloping sides. The bushings 71 and 72 and the arbor 1 are secured by shrink fitting, expansion fitting, interference fitting, keys, or the like. It is not necessary that the spacers 81 and 82 are fixed directly to the arbor 1, but they may be fixed at position only by a laterally pressing force from sides of the bearings. Alternatively, the spacers may be fixed by shrink fitting, expansion fitting, interference fitting, keys, or the like. The spacers 81, 82 may be in a shape shown in FIGS. 16(d) and 16(e).

The outer surfaces of the bushings 71 and 72 are secured to the inner races of the bearings 21, 22, and 23 in a like manner. A cylindrical sleeve 90 loosely fits over the bearings 21, 22, and 23. Thrust loads from the cylindrical sleeve 90 are transmitted through flanges 52 at opposite ends of the arbor 1 to bearings 51. The outer race of each bearing 51 is secured to the corresponding flange 52.

As shown in FIG. 5, an oil supply passageway 62 is formed in the center of the arbor 1 and extends to the outer end thereof in the same manner as in the embodiment of FIG. 3. However, it is not mandatory that the oil supply passageway 62 be at the center of the arbor 1, and it can be radially displaced from the center. In addition, there may be a plurality of inlets and discharge ports for lubricating oil.

Figure 6:
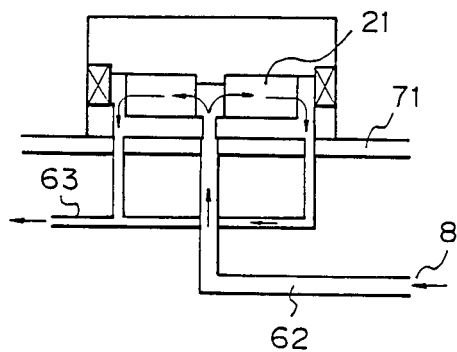
FIG. 6 is a schematic view of an oil supply pathway of an embodiment of a variable-crown roll in accordance with the present invention.

FIG. 6 is a cross-sectional view of a portion of another embodiment which is equipped with an oil mist supply passageway 62. An oil supply port 8 is formed in the end of the arbor 1, and oil mist which enters the oil supply port 8 is supplied to the bushings 71 and 72 through the oil mist supply passageway 62, from where it spreads to the antifriction bearings 21 and 22. The oil mist is then discharged through an oil recovery passageway 63.

Figure 7:
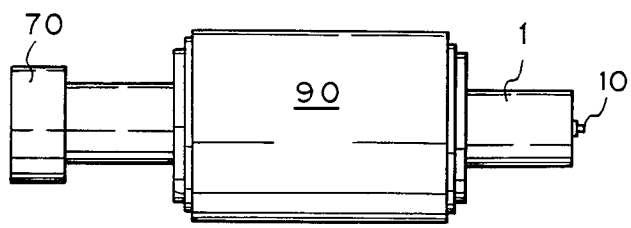
FIG. 7 is a front view of an embodiment of a variable-crown roll in accordance with the present invention which is equipped with an arbor angle adjusting mechanism.
Figure 8:
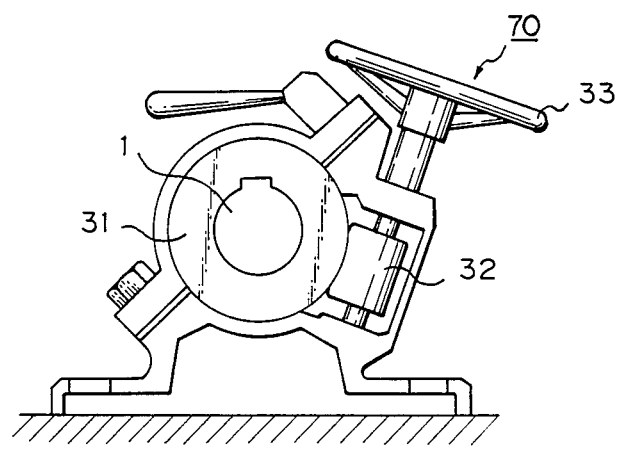
FIG. 8 is a side view of an arbor angle adjusting mechanism for a variable-crown roll in accordance with the present invention.

FIG. 7 is a front view of a variable-crown roll in accordance with the present invention which is equipped with an arbor angle adjusting mechanism 70 at one end of the arbor 1, and FIG. 8 is a side view of the arbor angle adjusting mechanism 70. By means of this mechanism 70, the arbor rotational angle and therefore the roll crown can be freely adjusted.

As shown in FIG. 8, a worm wheel 31 is secured to the end of an arbor 1 by a key, and the worm wheel 31 meshes with a worm 32 which is secured to one end of a shaft. An adjusting wheel 33 for rotating the shaft is mounted on the other end thereof. When the adjusting wheel 33 is rotated, the worm 32 rotates therewith, and the rotation of the worm 32 causes the worm wheel 31 and the arbor 1 to rotate together about the axis of the arbor 1. Therefore, the arbor 1 can be rotated to any desired angle by turning the adjusting wheel 33.

Figure 9:
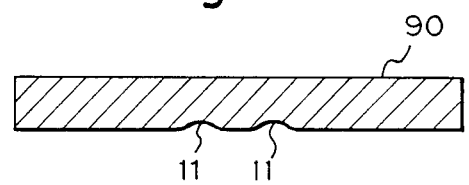
FIG. 9 is a cross-sectional view of a portion of a sleeve whose inner surface is chamfered.

If the corners of the bearings contact the cylindrical sleeve 90, the stress due to contact between the corners and the inner surface of the sleeve 90 becomes extremely high, and spalling of the inner surface of the sleeve 90 or similar damage can occur. Accordingly, in another preferred embodiment of the present invention, as shown in FIG. 9, depressions 11 having rounded edges are formed in the inner surface of the cylindrical sleeve 90 in the vicinity of the corners of the bearings. Each of the depressions 11 surrounds a corner of one of the bearings, but there is no direct contact between the corners and the depressions 11, so damage to the sleeve 90 due to high stresses can be avoided.

Instead of forming depressions 11 in the inner surface of the sleeve 90, it is possible to chamfer the corners of the bearings and obtain the same effect.

FIG. 10 schematically illustrates different types of rolling mills in which a variable-crown roll in accordance with the present invention can be effectively employed. Each of these arrangements is a rolling machine employing at least one variable-crown roll in accordance with the present invention as a back-up roll. The back-up roll is used together with a conventional roll bender such as a work roll bender, a back-up roll bender, or a double chock bender, and with this arrangement, shape control and/or profile control of rolled plate can be performed. In FIG. 10, element number 36 is a work roll and element number 38 is a back-up roll. All of the rolling mill arrangements shown in FIG. 10 are well known to those skilled in the art, and no further description thereof will be given. For each rolling mill, the arbor rotational angle of the variable-crown roll in accordance with the present invention and the force exerted by the roll bender are calculated on the basis of signals from an unillustrated shape measuring device or a profile measuring device disposed on the upstream and/or downstream sides of the rolling stand.

It is possible to adjust the arbor rotational angle of a variable-crown roll according to the present invention while rolling is being performed. Normally, however, a simpler control method is employed; namely, the arbor rotational angle is set in advance at a suitable value based on the dimensions and material characteristics of the item being rolled, the rolling temperature, and the like, and during rolling, control is performed mainly by adjusting the force applied by the roll bender. Nevertheless, when correcting shape irregularities of sheets caused by complex shape defect during cold rolling, it is desirable to perform shape control by simultaneously adjusting both the bending force of the roll bender and the roll crown of the back-up roll. In this case, in order to allow the rapid adjustment of the arbor rotational angle during high-speed rolling, it is desirable that the arbor angle adjusting mechanism 70 be powered by an electric motor or a hydraulic apparatus, whereby changes in the arbor rotational angle can be made quickly and with high precision. However, since in most cases the arbor rotational angle is set prior to rolling and remains the same throughout rolling, an inexpensive, mechanically-operated apparatus like that illustrated in FIG. 8 is normally adequate.

Next, the present invention will be described in further detail by means of a number of working examples.

EXAMPLE 1

In this example, a small, 4-high rolling mill was employed which used a variable-crown roll like that shown in FIG. 2 as a back-up roll on one side. The work rolls measured 80 mm in diameter and had a barrel length of 400 mm, while the back-up rolls measured 240 mm in diameter and had a barrel length of 400 mm. Taper roller bearings 21 and 22 (outer diameter=240 mm, inner diameter=170 mm, length=175 mm) were fit over an arbor 1 having an outer diameter of 170 mm and were secured thereto by keys. The slope angle $\alpha$ of the inner races of the bearings was 0.2°.

Accordingly, by rotating the arbor 1, the roll crown could be varied from a concave crown to a convex crown having the following magnitude:

$$\delta = \alpha \cdot l = 3.14 \times 0.2 / 180 \times 175 = 0.6 \text{ mm}.$$

A cylindrical sleeve 90 having an inner diameter of 250 mm and a wall thickness of 4 mm was fit loosely over the outer races of the bearings. Thrust loads from the sleeve 90 were received by supporting plates which supported both ends of the sleeve 90.

An arbor angle adjusting mechanism 70 like that shown in FIGS. 7 and 8 was installed on one end of the arbor 1.

Figure 13:
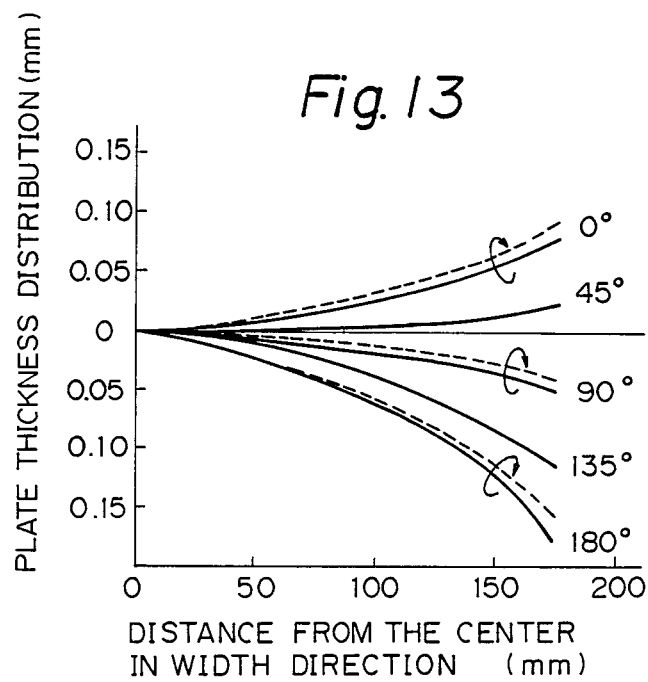
FIG. 13 is a graph showing the results of rolling using the variable-crown roll in acccordance with the present

The ability of this rolling mill to control the deflection of the work rolls was investigated. An aluminum plate measuring 4 mm thick and 350 mm wide was compressed between the work rolls with a force of 20 tons, and the distribution of dents in the aluminum plate was observed as an indication of variations in the roll deflection. During the rolling, the arbor rotational angle was varied from 0° to 180°, and the roll crown was varied in 5 steps from $\delta$ to $-\delta$. When the arbor rotational angle was 0°, the roll crown was $\delta$. The results of measurements are shown in FIG. 13. The abscissa indicates the distance from the widthwise center of the plate, and the ordinate indicates the deviation in mm of the thickness of the plate from the thickness at the widthwise center. Each curve is for a different value of the arbor rotational angle.

The maximum convex roll crown was obtained with an arbor rotational angle of 0°, and in this case, the plate thickness decreased towards the widthwise center thereof. The maximum concave roll crown was obtained with an arbor rotational angle of 180°, and in this case, the plate thickness increased towards its widthwise center. It can be seen that the profile of a plate can be freely adjusted by setting the arbor rotational angle. The magnitude of the roll crown which can be obtained is 5-10 times that possible using a conventional variable-crown roll.

The dashed lines in FIG. 13 show the results when an already-installed roll bender was employed together with an arbor rotational angle of 0°, 90°, and 180° At an angle of 0°, the plate crown was increased, whereas with an angle of 90° or 180°, the plate crown was decreased. Thus, the effects of the roll bender are superimposed on the effects of the variable-crown roll of the present invention, but the effects of the bender are far less than those of the variable-crown roll. When the rolling load greatly varies due to the plate thickness, the plate width, the material properties, and the like, the deflection of the work roll can be prevented by adjusting the arbor rotational angle, so if the arbor rotational angle is set at a suitable level, fine adjustment is preferably performed by adjusting the force applied by the roll bender.

During cold rolling sheets can easily become improperly shaped. Furthermore, there are cases in which a roll bender is only effective at the widthwise end portions of a sheet or plate. However, a variable-crown roll is able to perform shape control up to the widthwise center of a plate, so when employed together with a roll bender, a good shape can be guaranteed.

It was also confirmed that if a shape detector and a profile detector are disposed on the upstream and/or downstream side of a rolling mill employing a variable-crown roll of the present invention, the arbor rotational angle of the variable-crown roll and the roll bender can both be automatically controlled, and plates having a good shape and profile can be obtained.

EXAMPLE 2

Figure 15:
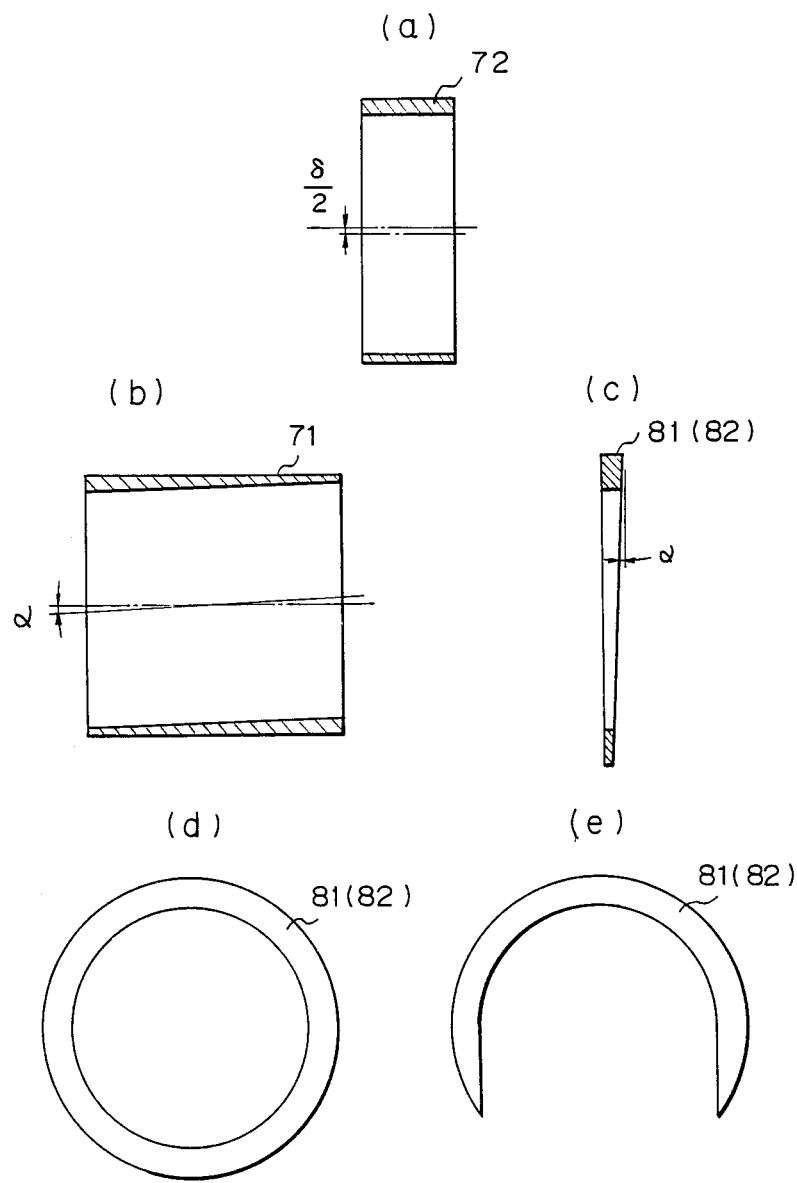
FIGS. 15a and 15b are longitudinal cross-sectional views of a bushing with parallel, eccentric walls, and a bushing with sloping walls.
FIG. 15c-15e are respectively cross sectional views and a front view of a spacer with sloping sides for a variable-crown roll in accordance with the present invention.

In this example, a small, 4-high rolling mill was employed which used a variable-crown roll like that shown in FIG. 5 as a back-up roll on one side. The work rolls had a diameter of 80 mm and a barrel length of 460 mm, while the back-up rolls had a diameter of 240 mm and a length of 460 mm. Bushings 71 like that shown in FIG. 15$b$ and bushings 72 like that shown in FIG. 15$a$ were secured by keys to an arbor 1 having an outer diameter of 140 mm. The inner surface of each of bushings 71 was skewed by an angle $\alpha$ of 0.2° with respect to the axial center of the outer surface, and the center of the inner surface of each bushing 72 was eccentric with respect to the axial center of the outer surface by an amount $\delta/2$. Sealed Sendzimir-type bearings 21 and 22 (outer diameter=240 mm, inner diameter=150 mm, length=48 mm) were fit over each bushing by an interference fit. The bearings 21 and 22 were positioned by sloped spacers 81 and 82 like that shown in FIG. 15$c$, which were secured to the arbor 1 with keys. A cylindrical sleeve 90 having an inner diameter of 240.5 mm and a wall thickness of 5 mm was loosely fit over the outer races of the bearings 21 and 22. A flange 52 which received thrust loads from the sleeve 90 during rolling was secured to each end of the arbor 1, and sealed bearings 51 whose outer races were secured to the flanges 52 were secured to the ends of the sleeve 90. An oil supply port 8 was formed in the arbor 1, and lubricating oil was supplied to the space between the outer races of the antifriction bearings 21 and 22 and the inner surface of the sleeve 90 through holes formed in the sloped spacers 81 and 82. The lubricating oil was sealed inside the sleeve 90 by seals 85 which were mounted on the flanges 52.

If the arbor 1 was rotated one time, the crown on the outer races of the bearings changed from a convex crown to a concave crown having the following magnitude:

$$67 = \alpha \cdot l = 3.14 \times 0.2 / 180 \times 144 = 0.5 \text{ mm}.$$

An arbor angle adjusting mechanism 70 like that shown in FIGS. 7 and 8 was installed on one end of the arbor 1.

The ability of this rolling mill to control the deflection of the work roll was investigated in the same manner as in Example 1. In this example, an aluminum plate having a thickness of 4 mm and a width of 350 mm was compressed between the work rolls under a load of 40 tons, and variation in the roll deflection was determined on the basis of the distribution of depressions in the aluminum plate. The results are shown by the solid lines in FIG. 14a.

In this example, a roll crown which was 3-5 times as large as that obtainable with a conventional variable-crown roll was obtained.

The dashed lines in FIG. 14a shows the results when an already-installed roll bender was employed with an arbor rotational angle of 0° and 180°. As in Example 1, the effects produced by the roll bender were superimposed on the effects of the variable-crown roll.

As in the preceding example, it was confirmed that if a shape detector and a profile detector are disposed on the upstream and/or downstream side of a rolling mill employing a variable-crown roll of the present invention, the arbor rotational angle of the variable-crown roll and the force applied by the roll bender can both be automatically controlled, and plates having a good shape and profile can be obtained In addition, the durability of a variable-crown roll in accordance with the present invention was investigated during a continuous rolling test. The prelubricated sealed bearings required no maintenance. Because oil was constantly supplied to the space between the cylindrical sleeve 90 and the outer races of the bearings, seizure of the bearings and wear was completely prevented.

EXAMPLE 3

This example was nearly identical to Example 2, but the slope angle α was increased to 0.4°, whereby the crown was doubled. As in Example 2, an aluminum plate with a thickness of 4 mm and a width of 350 mm was compressed under a load of 40 tons, and the crown control was evaluated on the basis of the distribution of depressions in the aluminum plate.

The results are shown in FIG. 14b. The plate crown was roughly 2 times that obtained in Example 2 and was roughly 5-10 times that obtainable using a conventional variable-crown roll. The variable-crown roll of this example exhibited the same durability as the one employed in Example 2.

EXAMPLE 4

This example was substantially the same as Example 3 except that the wall thickness of the sleeve 90 was increased to 10 mm. In the same manner as in Example 3, an aluminum was compressed under a load of 40 tons, and the crown control ability was evaluated on the basis of the distribution of depressions in the plate.

The results are shown in FIG. 14c. In this example, due to the increased stiffness of the sleeve, the sleeve 90 did not conform to the shape of the outer races of the bearings to the same extent as in Example 3, so the crown which was obtained was somewhat smaller than for Example 3. However, the crown was still 3-6 times that which is obtainable with a conventional variable-crown roll.

Since the outer surface of the sleeve of a roll of the present invention undergoes wear due to contact with a work roll, it is desirable for the wall thickness of the sleeve to be relatively large. However, as the magnitude of crown decreases as the wall thickness of the sleeve increases, the sleeve thickness should be selected in accordance with the rolling conditions and the desired degree of crown.

EXAMPLE 5

This example was nearly the same as Example 2 except that a solid arbor was employed which did not have an oil supply port 8 for lubricating oil. In addition, the arbor was not equipped with seals 85. The same amount of crown as for Example 2 was obtained. In a durability test, wear and seizure of the outer races of the bearings and the inner surface of the sleeve occurred, and the life span was lower than for Example 2. However, when operation was performed at a low rotational speed or under a small load, there was no reduction in the life span of the sleeve.

As described above, a rolling mill which employs at least one variable-crown roll in accordance with the present invention as a back-up roll or a work roll together with an already-existing roll bender can perform rolling with greatly improved control of shape and profile. Since a variable-crown roll of the present invention can be quickly installed in a conventional rolling mill in place of a conventional back-up roll, it provides crown control at a low cost.

Furthermore, as it is only necessary to replace the cylindrical sleeve when it undergoes wear, a variable-crown roll of the present invention can be economically maintained so as to obtain a semipermanent life span.

A variable-crown roll in accordance with the present invention can also be employed as a work roll. However, in this case, the requirements as to the sleeve thickness, the material constituting the sleeve, the sleeve hardness, and the like are stricter than when the roll is used as a back-up roll.

As shown in FIG. 10c, a variable-crown roll in accordance with the present invention can be employed as a back-up roll in a 4-high rolling mill. As this type of rolling mill generally provides little control over shape or profile, the effects of employing a roll of the present invention in a rolling mill of this type are particularly great.

We claim:

1. A variable-crown roll comprising:
    a straight arbor; and
    a plurality of antifriction bearings which are mounted on said arbor, each of said bearings having a cylindrical outer surface which is sloped with respect to the outer surface of said arbor, said bearings being symmetrically disposed with respect to the lengthwise center of said arbor, the slopes of the outer surfaces of said bearings on one side of the lengthwise center of said arbor being symmetric with respect to the slopes of the outer surfaces of said bearings on the other side of the lengthwise center.

2. A variable-crown roll as claimed in claim 1, wherein:
    said bearings are directly mounted on the outer surface of said arbor; and
    each of said bearings has an inner race and an outer race, the inner race being eccentric with respect to the outer race at the ends of each bearing, said outer race having a uniform thickness around its circumference and along its length.

3. A variable-crown roll as claimed in claim 1, wherein each of said bearings has an inner race and an outer race, each of which has a uniform thickness around its circumference and along its length, further comprising a plurality of bushings which are secured to the outer surface of said arbor, each of said bushings have an inner peripheral surface and an outer peripheral surface which is eccentric with respect to the inner peripheral surface at the ends of the bushing, whereby the outer peripheral surface of each bushing is sloped with respect to the outer peripheral surface of said arbor, the inner race of each bearing being fit over the outer peripheral surface of one of said bushings.

4. A variable-crown roll as claimed in claim 3, wherein a plurality of said bearings are mounted on each of said bushings, further comprising at least one spacer which is disposed between adjacent bearings.

5. A variable-crown roll as claimed in claim 4, wherein said spacer has parallel sides.

6. A variable-crown roll as claimed in claim 1, wherein at least one spacer is mounted on said arbor and is disposed between adjacent bearings, said spacer having sloping sides.

7. A variable-crown roll as claimed in claim 1, wherein at least one of said bearings has an inner race and an outer race which is wider than the inner race.

8. A variable-crown roll as claimed in claim 1, wherein said bearings are sealed bearings.

9. A variable-crown roll as claimed in claim 1, further comprising an oil supply passageway which is formed in said arbor for supplying an oil mist to said bearings and an oil recovery passageway which is formed in said arbor for recovering said oil mist.

10. A variable-crown roll as claimed in claim 1, further comprising means for rotating said arbor by a prescribed angle about its longitudinal axis.

11. A variable-crown comprising:
a straight arbor;
a plurality of antifriction bearings which are mounted on said arbor, each of said bearings having a cylindrical outer surface which is sloped with respect to the outer surface of said arbor, said bearings being symmetrically disposed with respect to the lengthwise center of said arbor, the slopes of the outer surfaces of said bearings on one side of the lengthwise center of said arbor being symmetric with respect to the slopes of the outer surfaces of said bearings on the other side of the lengthwise center;
a cylindrical sleeve which loosely fits over said bearings; and
means for transmitting thrusts from said cylindrical sleeve to said arbor.

12. A variable-crown roll as claimed in claim 11, wherein:
said bearings are directly mounted on the outer surface of said arbor; and
each of said bearings has an inner race and an outer race, the inner race being eccentric with respect to the outer race at the ends of each bearing, said outer race having a uniform thickness around its circumferences and along its length.

13. A variable-crown roll as claimed in claim 11, wherein each of said bearings has an inner race and an outer race, each of which has a uniform thickness around its circumference and along its length, further comprising a plurality of bushings which are secured to the outer surface of said arbor, each of said bushings having an inner peripheral surface and an outer peripheral surface which is eccentric with respect to the inner peripheral surface at the ends of the bushing, whereby the outer peripheral surface of said bushing is sloped with respect to the outer surface of said arbor, the inner race of each bearing being fit over the outer peripheral surface of one of said bushings.

14. A variable-crown roll as claimed in claim 13, wherein a plurality of said bearings are mounted on each of said bushings, further comprising at least one spacer which is disposed between adjacent bearings.

15. A variable-crown roll as claimed in claim 14, wherein said spacer has parallel sides.

16. A variable-crown roll as claimed in claim 11, wherein at least one spacer is mounted on said arbor, and is disposed between adjacent bearings, said spacer having sloping sides.

17. A variable-crown roll as claimed in claim 11, wherein at least one of said bearings has an inner race and an outer race which is wider than the inner race.

18. A variable-crown roll as claimed in claim 11, wherein said bearings are sealed bearings.

19. A variable-crown roll as claimed in claim 11, further comprising an oil supply passageway which is formed in said arbor for supplying an oil mist to said bearings and an oil recovery passageway which is formed in said arbor for recovering said oil mist.

20. A variable-crown roll as claimed in claim 11, further comprising an oil supply passageway for supplying oil between the outer surfaces of said bearings and the inner surface of said cylindrical sleeve.

21. A variable-crown roll as claimed in claim 11, further comprising means for rotating said arbor by a prescribed angle about its longitudinal axis.

22. A variable-crown roll comprising:
a straight arbor;
a plurality of first antifriction bearings which are mounted on said arbor, each of said first bearings having a cylindrical outer surface which is sloped with respect to the outer surface of said arbor, said first bearings being symmetrically disposed with respect to the lengthwise center of said arbor such that the slopes of the outer surfaces of said first bearings on one side of the lenghtwise center of said arbor are symmetric with respect to the slopes of the outer surfaces of said first bearings on the other side of the lengthwise; center; and
second antifriction bearings which is mounted on the center of said arbor between said first bearings, said second bearing having a cylindrical outer surface which is parallel to but eccentric with respect to the outer surface of said arbor.

23. A variable-crown roll as claimed in claim 22, wherein:
said first and second bearings are directly mounted on the outer surface of said arbor; and
each of said first bearings has an inner race and an outer race, the inner race being eccentric with respect to the outer race at the ends of each bearing, said outer race having a uniform thickness around its circumference and along the length.

24. A variable-crown roll as claimed in claim 22, wherein each of said first and second bearings has an inner race and an outer race, each of which has a uniform thickness around its circumference and along its length, further comprising a plurality of first bushings which are secured to the outer surface of said arbor, each of said first bushings having an inner peripheral surface and an outer peripheral surface which is eccentric with respect to the inner peripheral surface at the ends of the first bushings, whereby the outer peripheral surface of each first bearings is sloped with respect to the outer surface of said arbor, and a second bushing which is secured to the outer surface of said arbor at the center thereof between said first bushings, said second bushing having inner and outer peripheral surfaces which are parallel to the outer surface of said arbor, but eccentric with respect to one another the inner race of each of said first bearings being fit over the outer peripheral surface of one of said first bushings and the inner race of said second bearing being fit over the outer peripheral surface of said second bushing.

25. A variable-crown roll as claimed in claim 24, wherein a plurality of said first bearings are mounted on each of said first bushings, further comprising at least one spacer which is disposed between adjacent bearings.

26. A variable-crown roll as claimed in claim 25, wherein said spacer has parallel sides.

27. A variable-crown roll as claimed in claim 22, wherein at least one spacer is mounted on said arbor, and is disposed between adjacent bearings, said spacer having sloping sides.

28. A variable-crown roll as claimed in claim 22, wherein at least one of said first and second bearings has an inner race and an outer race which is wider than the inner race.

29. A variable-crown roll as claimed in claim 22, wherein said first and second bearings are sealed bearings.

30. A variable-crown roll as claimed in claim 22, further comprising an oil supply passageway which is formed in said arbor for supplying an oil mist to said first and second bearings and an oil recovery passageway which is formed in said arbor for recovering said oil mist.

31. A variable-crown roll as claimed in claim 22, further comprising means for rotating said arbor by a prescribed angle about its longitudinal axis.

32. A variable-crown roll comprising:
a straight arbor;
a plurality of first antifriction bearings which are mounted on said arbor, each of said first bearings having a cylindrical outer surface which is sloped with respect to the outer surface of said arbor, said first bearings being symmetrically disposed with respect to the lengthwise center of said arbor such that the slopes of the outer surfaces of said first bearings on one side of the lengthwise center of said arbor are symmetric with respect to the slopes of the outer surfaces of said first bearings on the other side of the lengthwise center;
a second antifriction bearing which is mounted on the center of said arbor between said first bearings, said second bearing having a cylindrical outer surface which is parallel to but eccentric with respect to the outer surface of said arbor;
a cylindrical sleeve which loosely fits over said first and second bearings; and
means for transmitting thrusts from said cylindrical sleeve to said arbor.

33. A variable-crown roll as claimed in claim 32, wherein:

said first and second bearings are directly mounted on the outer surface of said arbor; and
each of said first bearings has an inner race and an outer race, the inner race being eccentric with respect to the outer race at the ends of each bearing, said outer race having a uniform thickness around its circumference and along its length.

34. A variable-crown roll as claimed in claim 32, wherein each of said first and second bearings has an inner race and an outer race, each of which has a uniform thickness around its circumference and along its length, further comprising a plurality of first bushings which are secured to the outer surface of said arbor, each of said first bushings having an inner peripheral surface and an outer peripheral surface which is eccentric with respect to the inner peripheral surface at the ends of the first bushing, whereby the outer peripheral surface of each first bearing is sloped with respect to the outer surface of said arbor, and a second bushing which is secured to the outer surface of said arbor at the center thereof between said first bushings, said second bushing having inner and outer peripheral surfaces which are parallel to the outer surface of said arbor, but eccentric with respect to one another the inner race of each of said first bearings being fit over the outer peripheral surface of one of said first bushings and the outer race of said second bearing being fit over the outer peripheral surface of said second bushing.

35. A variable-crown roll as claimed in claim 34, wherein a plurality of said first bearings are mounted on each of said first bushings, further comprising at least one spacer which is disposed between adjacent bearings.

36. A variable-crown roll as claimed in claim 35, wherein said spacer has parallel sides.

37. A variable-crown roll as claimed in claim 32, wherein at least one spacer is mounted on said arbor, and is disposed between adjacent bearings, said spacer having sloping sides.

38. A variable-crown roll as claimed in claim 32, wherein at least one of said first and second bearings has an inner race and an outer race which is wider than the inner race.

39. A variable-crown roll as claimed in claim 32, wherein said first and second bearings are sealed bearings.

40. A variable-crown roll as claimed in claim 32, further comprising an oil supply passageway which is formed in said arbor for supplying an oil mist to said first and second bearings and an oil recovery passageway which is formed in said arbor for recovering said oil mist.

41. A variable-crown roll as claimed in claim 32, further comprising an oil supply passageway for supplying oil between the outer surfaces of said first and second bearings and the inner surface of said cylindrical sleeve.

42. A variable-crown roll as claimed in claim 32, further comprising means for rotating said arbor by a prescribed angle about its longitudinal axis.

* * * * *